United States Patent
Dokania et al.

(10) Patent No.: US 8,238,402 B2
(45) Date of Patent: Aug. 7, 2012

(54) SYSTEMS AND METHODS FOR PCO BASED UWB IMPULSE RADIO WITH LOCALIZED SYNCHRONIZATION DETECTION AND RETENTION

(75) Inventors: Rajeev K. Dokania, Ithaca, NY (US); Xiao Y. Wang, Ithaca, NY (US); Alyssa B. Apsel, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 13/141,832

(22) PCT Filed: Dec. 22, 2009

(86) PCT No.: PCT/US2009/069195
§ 371 (c)(1),
(2), (4) Date: Jul. 11, 2011

(87) PCT Pub. No.: WO2010/110830
PCT Pub. Date: Sep. 30, 2010

(65) Prior Publication Data
US 2011/0261859 A1      Oct. 27, 2011

Related U.S. Application Data

(60) Provisional application No. 61/140,143, filed on Dec. 23, 2008.

(51) Int. Cl.
*H04B 1/00* (2006.01)
(52) U.S. Cl. ........ 375/130; 375/316; 375/327; 375/373; 375/376

(58) Field of Classification Search ............ 375/130, 375/316, 327, 373, 376
See application file for complete search history.

(56) References Cited

U.S. PATENT DOCUMENTS

| 7,233,630 | B2 * | 6/2007 | Murakami et al. ............ 375/316 |
| 2007/0110125 | A1 | 5/2007 | Fujita et al. |
| 2010/0190517 | A1 * | 7/2010 | Wang et al. ................. 455/500 |

FOREIGN PATENT DOCUMENTS
EP   1852998 A1   11/2007

OTHER PUBLICATIONS

International Search Report and Written Opinion dated Oct. 8, 2010 for PCT/US09/69195.
Hong, et al. "A scalable synchronization protocol for large scale sensor networks and its application." IEEE J. on Selected Areas in Comm. 23(5), May 2005, 1085-1099.
Wang et al. "Pulse Coupled Oscillator Synchronization for Low Power UWB Wireless Transceivers." 50th Midwest Symposium on Circuits and Systems (MWSCAS), Aug. 2007, 1524-1527.

* cited by examiner

*Primary Examiner* — Ted Wang
(74) *Attorney, Agent, or Firm* — Burns & Levinson LLP; Jacob N. Erlich; David W. Gomes

(57) ABSTRACT

The present invention provides a communications system, node and method of operation for forming a wireless network from independently operating nodes that have the ability to self-synchronize with each other, independently determine master and slave modes of operation to cooperate as a network, and independently vary those functions to adjust to changes in the network.

11 Claims, 14 Drawing Sheets

SYSTEMS AND METHODS FOR PCO BASED UWB IMPULSE RADIO WITH LOCALIZED SYNCHRONIZATION DETECTION AND RETENTION

CROSS REFERENCE TO RELATED APPLICATIONS

This application is the U.S. national phase entry under 35 U.S.C. §371 of International Application No. PCT/US09/69195 filed Dec. 22, 2009 entitled SYSTEMS AND METHODS FOR PCO BASED UWB IMPULSE RADIO WITH LOCALIZED SYNCHRONIZATION DETECTION AND RETENTION, which in turn claims priority from U.S. Provisional Application Ser. No. 61/140,143, filed Dec. 23, 2008 for SYSTEMS AND METHODS FOR PCO BASED UWB IMPULSE RADIO WITH LOCALIZED SYNCHRONIZATION DETECTION & RETENTION, both of which are incorporated herein by reference herein in their entirety for all purposes.

STATEMENT OF GOVERNMENT INTEREST

This invention was made with Government support under Grant Number IDW911NF-05-10515 awarded by the Army Research Office. The United States Government has certain rights in the invention.

BACKGROUND OF THE INVENTION

The present invention generally relates to wireless communications nodes, and in particular to such devices which have the independent ability to form communications networks.

Ultra-wideband (UWB) radio is a method of RF/wireless communications utilizing short duration pulses instead of a continuous wave sinusoid to transmit information. Whereas continuous wave signal is constantly active both during data transmission as well as after, an UWB signal is only active during pulse transmissions, which allows the R.F. front end to be turned off during inactive periods.

It is well known that the time-limited, wide spectrum signaling in UWB promises greater network capacity over traditional radio architectures, allowing superior data-rate and spatial capacity at similar power consumption over short distances. The short pulse signaling also allows duty cycling of the RF front end to save power. However, achieving these benefits of ultra-wideband communications is contingent on precise synchronization between transmitter and receiver such that transmitted pulses are received. For instance, if a transmitter and receiver are not synchronized to the same clock and a pulse is transmitted, the receiver may not be active and miss the data. However, if the two are synchronized together, then the receiver will be able to capture the pulse even as the receive duty cycle is reduced.

A popular practical implementation of synchronization is in the use of a high speed DLL/PLL in conjunction with a digital pulse tracking backend that maintains synchronization throughout the period of communications. The drawback of this approach is that the receiver and transmitter clocks must have center frequencies matched on the order of ten to hundreds of parts per million to maintain adequate synchronization, thereby necessitating that the local oscillators of both the transmitter and receiver be referenced to well matched crystals so that frequency drift between them is minimized. This requirement for a crystal imposes a significant cost to a system that a manufacturer would ideally like to avoid.

SUMMARY OF THE INVENTION

One embodiment of the present invention provides an independent node for operating in a wireless communications network including a plurality of said independent nodes, comprising R.F. circuitry adapted for wirelessly transmitting and receiving pulses between nodes, an internal pulse coupled oscillator (PCO) having a periodic state function ending in a PCO firing, and coupled to the R.F. circuitry for transmitting a sync pulse at the PCO firing, circuitry coupled to increment the state function in response to external sync pulses received from other nodes, and a state machine adapted to switch between synchronized and unsynchronized operation in response to sync pulses received from other nodes, and including first circuitry coupled to identify if and when external sync pulses from other nodes are received between PCO firings to cause the state machine to select either an unsynchronized mode of operation or synchronized, slave or master modes of operation in response thereto.

The first circuitry may be coupled to identify a First Event if a single external sync pulse is received from other nodes between PCO firings and within a predetermined period before the PCO firing. The first circuitry may include a counter coupled to determine if a predetermined number of First Events occur to cause the state machine to select a synchronized, slave mode of operation in response thereto. The node may further comprise a phase-locked-loop (PLL) coupled to the PCO to generate time interval signals between PCO firings, wherein the first circuitry is adapted to indicated when an external sync pulse from another node is not received in the slave mode of operation, and further wherein the PLL is coupled to provide an internal sync pulse to the PCO in the selected slave mode of operation when an external sync pulse from another node is not received between PCO firings.

The first circuitry may be coupled to identify a Second Event if no external sync pulses are received from other nodes between PCO firings except for a predetermined window following the PCO firing. The first circuitry may include a counter coupled to determine if a predetermined number of Second Events occur to cause the state machine to select the synchronized, master mode of operation in response thereto.

The node may further comprise circuitry coupled to the R.F. circuitry to switch between different frequency bands for the receipt and transmission of sync pulses versus data pulses. The node may also further comprise pulse shaping or transmitting circuitry coupled to the R.F. circuitry and adapted to dither a center frequency of pulses transmitted from the node during transmission of the pulses to help shape a transmission spectrum of the pulses.

Another embodiment of the present invention provides a wireless communications system having a plurality of independent nodes forming a network, each node comprising: R.F. circuitry adapted for wirelessly transmitting and receiving pulses between nodes; an internal pulse coupled oscillator (PCO) having a periodic state function ending in a PCO firing, and coupled to the R.F. circuitry for transmitting a sync pulse at the PCO firing; circuitry coupled to increment the state function in response to external sync pulses received from other nodes; and a state machine adapted to switch between synchronized and unsynchronized operation in response to sync pulses received from other nodes, and including first circuitry coupled to identify if and when external sync pulses from other nodes are received between PCO firings to cause the state machine to select either an unsynchronized mode of operation or synchronized, slave or master modes of operation in response thereto.

The first circuitry may be coupled to identify a First Event if a single external sync pulse is received from other nodes between PCO firings and within a predetermined period before the PCO firing, and further wherein the first circuitry includes a counter coupled to determine if a predetermined number of First Events occur to cause the state machine to select a synchronized, slave mode of operation in response thereto. The system may further comprise a phase-locked-loop (PLL) coupled to the PCO to generate time interval signals between PCO firings, wherein the first circuitry is adapted to indicated when an external sync pulse from another node is not received in the slave mode of operation, and further wherein the PLL is coupled to provide an internal sync pulse to the PCO in the selected slave mode of operation when an external sync pulse from another node is not received between PCO firings.

Yet another embodiment of the present invention provides an independent node for operating in an ultra wideband wireless communications network including a plurality of said independent nodes, comprising, R.F. circuitry adapted for wirelessly transmitting and receiving pulses between nodes, and pulse shaping or transmitting circuitry coupled to the R.F. circuitry and adapted to dither a center frequency of pulses transmitted from the node during transmission of the pulses to help reshape a transmitted spectrum of the pulses.

Still another embodiment of the present invention provides a method for operating, independent wireless communications nodes to cooperate as a synchronized network, comprising the steps of, transmitting a sync pulse from each node upon firing of an internal pulse coupled oscillator (PCO) having a state function, incrementing the state function in response to external sync pulses received from other nodes, providing a state machine in each node to switch between synchronized and unsynchronized operation, first determining if any external sync pulses are received from other nodes between firings of the internal PCO except for a predetermined period after each firing, and first selecting a synchronized, master mode of operation in response to the first determining step in the absence of any external sync pulses being received from other nodes between firings of the internal PCO except for a predetermined period after each firing.

The method may further comprise controlling R.F. component duty-cycling with the state machine and second selecting R.F. component duty-cycling in conjunction with the step of first selecting the master node of operation. The method may further comprise the steps of periodically deselecting R.F. component duty-cycling, first repeating the step of first determining, and second repeating the step of first selecting in response to the step of first repeating. The method may also further comprise third selecting an unsynchronized mode of operation in response to the step of first repeating in the presence of external sync pulses being received from other nodes between firings of the internal PCO except for a predetermined period after each firing.

The method may further comprise the steps of second determining if an external sync pulse from another node is received within a predetermined period before firing of the internal PCO, fourth selecting a synchronized, slave mode of operation in response to the step of second determining, third determining when an external sync pulse from another node is not received in the slave mode of operation, and providing an internal sync pulse in the selected slave mode of operation from an internal phase-locked-loop in response to the step of third determining.

Still another embodiment of the present invention provides a method for operating a wireless communications node to cooperate in a synchronized network of wireless nodes, comprising the steps of running an internal pulse coupled oscillator (PCO) with a state function to periodic firing for allowing synchronization with one or more other nodes, incrementing the state function in response to external sync pulses received from other nodes, providing a state machine in each node to switch between synchronized and unsynchronized operation, first determining if an external sync pulse from another node is received within a predetermined period before firing of the internal PCO, selecting a synchronized, slave mode of operation in response to the step of first determining, second determining when an external sync pulse from another node is not received in the slave mode of operation, and providing an internal sync pulse in the selected slave mode of operation from an internal phase-locked-loop in response to the step of second determining.

The method may further comprise controlling R.F. component duty-cycling with the state machine and selecting R.F. component duty-cycling of the node in the selected slave mode of operation. The method may also comprise deselecting R.F. component duty-cycling in the selected slave mode of operation in response to the step of second determining. The method may further comprise the steps of third determining if an external sync pulse from another node is received within a predetermined period before firing of the internal PCO, and reselecting R.F. component duty-cycling of the node in the selected slave mode of operation in response to the step of third determining. The method may even further comprise switching to unsynchronized operation from the slave mode in response to the step of second determining when an external sync pulse is not received over a predetermined number of PCO firings.

BRIEF DESCRIPTION OF THE DRAWINGS

The present invention is illustratively shown and described in reference to the accompanying drawings, in which.

DETAILED DESCRIPTION OF THE DRAWINGS

Figure 1:
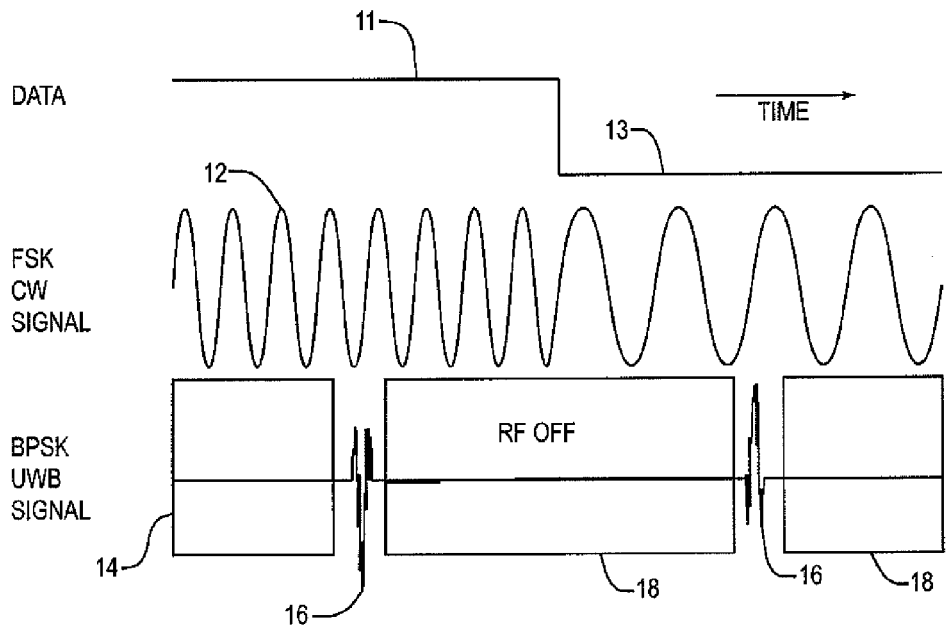
FIG. 1 is a Prior Art diagram of the difference between traditional continuous wave communications and UWB transmissions.

Ultra-wideband (UWB) radio is a method of RF/wireless communications utilizing short duration pulses instead of a continuous wave sinusoid to transmit information. FIG. 1 shows the difference between a continuous wave signal 12 and an UWB signal 14. Whereas continuous wave signal 12 is constantly active both during data transmission 11 as well as after 13, an UWB signal 14 is only active during pulse transmissions 16, which allows the R.F. front end to be turned off during inactive periods 18.

Figure 2:
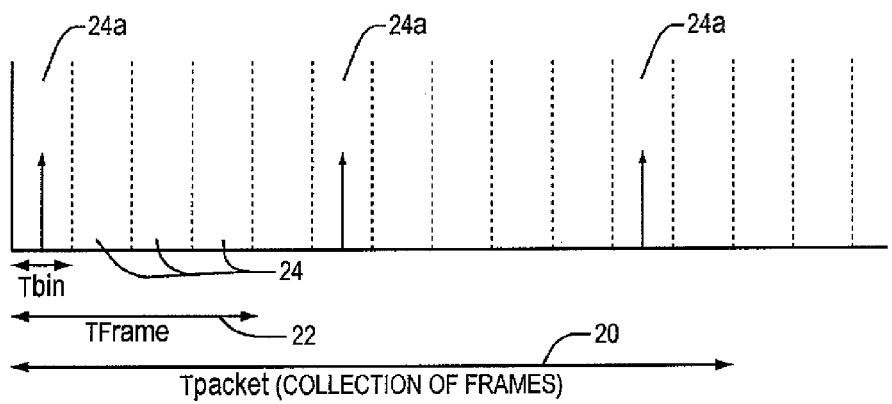
FIG. 2 is a Prior Art schematic of time domain multiplexing with each packet including three frames and each frame includes four data bins.

A popular method of UWB signaling is time hopping for low to medium pulse rates on the order of hundreds of KHz to the low hundreds of MHz. The time hopping method of UWB transmissions is based on a transmitter sending time limited pulses of data at times known by the receiver, which looks at the received signal at the agreed-upon times and determines the data that was sent. FIG. 2 shows a popular manifestation of the above method which divides each UWB transmission packet 20 into frames 22 and then further subdivides those frames 22 into bins 24. Many frames 22 compose a packet 20, while many bins 24 compose a frame 22. Within each frame 22, there can be only one transmission of an UWB data pulse. This transmission will fall into a certain bin 24a. The bin 24a that the pulse falls in will be determined by a template sequence that is common to both receiver and transmitter. Thus a receiver with the same template sequence as the transmitter will know the appropriate bins over which to look for the data, while pulses from other transmitters will fall in other bins where they are ignored. Synchronization is vital in this scheme because without it, the receiver cannot know when the transmitted data is valid.

Figure 3B:
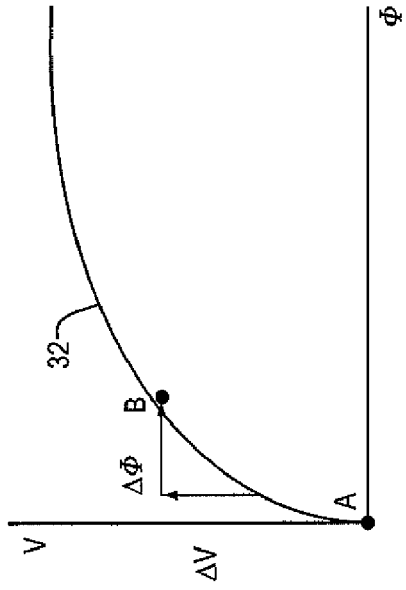
FIGS. 3(a)-(d) are graphical depictions of the state function of two pulse coupled oscillators suitable for use with the present invention.

To facilitate synchronization between nodes of a wireless UWB network, the present invention utilizes a pulse coupled oscillator (PCO) system. The PCO system is composed of identical oscillators following a state function 30, 32, as shown in FIGS. 3(a) and 3(b) for two oscillators. The state function 30 for a first oscillator i is a variable V that is a function of a normalized time, $\Phi_i = t_i/T_0$, where $t_i$ is the time since the first oscillator i last reset and $T_0$ is the time a free running oscillator takes to complete a cycle. All oscillators may start at random initial points A on the state curve and travel along the state function at a constant and identical rate. When the oscillator for state function 30 completes a period at 34, it emits an instantaneous synchronizing or coupling pulse ΔV to every other oscillator in the system, as indicated for state function 32 for oscillator ii in FIG. 3(b), causing them to advance in state or increment by ΔV. If the state function is monotonically increasing and concave down, then the system of identical oscillators perfectly phase-locks, and hence the firing times also synchronize. Each firing drives the oscillators' phases closer together through the nonlinearity of the state function.

Figure 3D:
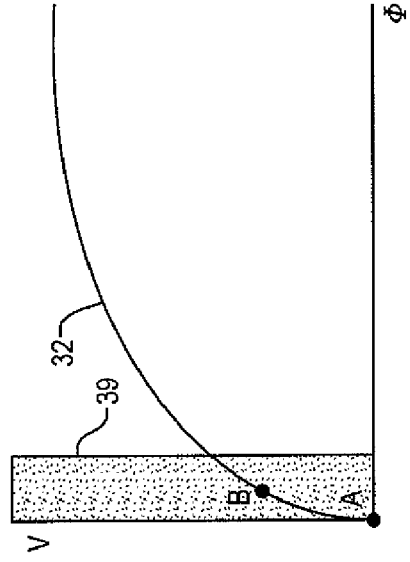
Figure 3A:
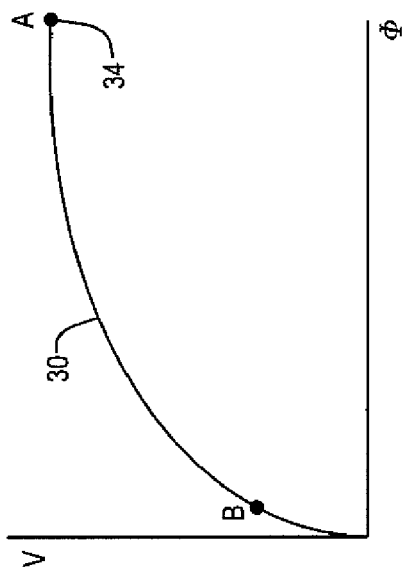
Figure 3C:
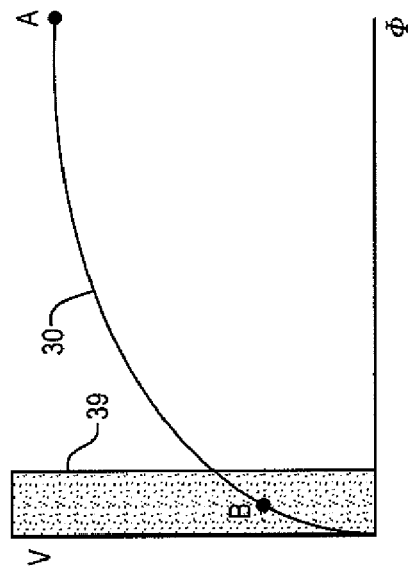

The oscillators may also include a blackout period 39, as in FIGS. 3(c) and 3(d), which correspond to the same two state functions. During blackout period 39 no incremental ΔV coupling is accepted, which introduces a static offset of $\Delta T < T_{blackout}$. This provides synchronization of the nodes even in the presence of propagation delay, path loss and imperfectly matched oscillator nominal frequencies.

Figure 4:
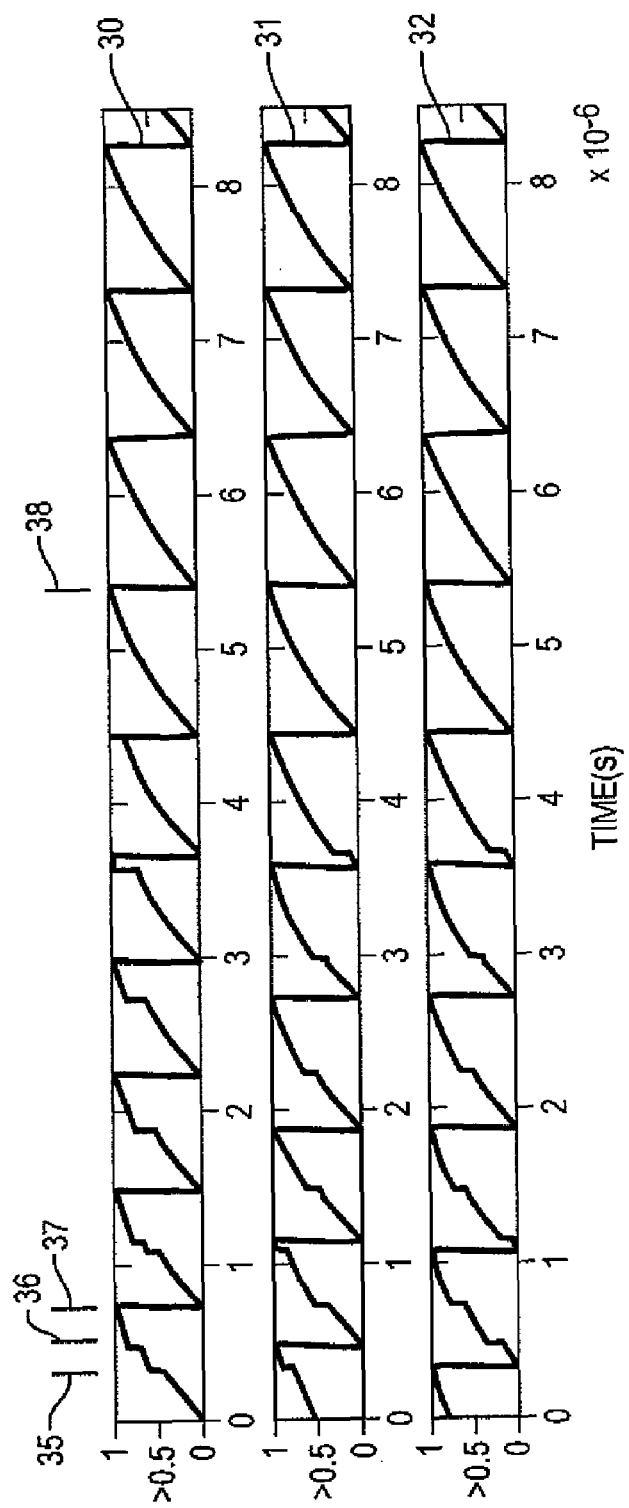
FIG. 4 is a depiction of the transition of three pulse-coupled oscillators from a non-synchronized state to a synchronized state.

FIG. 4 shows the synchronization of three state functions 30, 31 and 32 over a period of seven PCO firings. At time point 35, state function 32 fires causing incremental increases in state functions 30 and 31. At time point 36, state function 31 fires causing incremental increases in state functions 30 and 32. At time point 37, state function 30 fires causing incremental increases in state functions 31 and 32. This pattern continues until time point 38 when all three state functions 30, 31 and 32 are fully synchronized.

Figure 5:
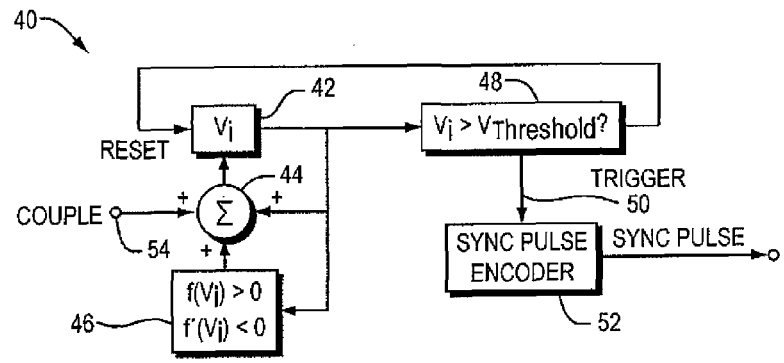
FIG. 5 is a block diagram of an oscillator circuit embodying the state function of FIGS. 3(a)-(d)

A generic system oscillator 40 implementing the state function of FIGS. 3(c) and 3(d) is shown in FIG. 5. The state $V_i$ 42 is constantly added to by an addition block 44 that senses $V_i$ and adds a $f(V_i)$ 46 that is positive and decreasing for increasing values of $V_i$. $V_i$ 42 then feeds into a threshold detector 48 that sends a trigger signal 50 when the threshold is reached. The trigger signal may then be encoded at 52 in such a way as make it more immune to noise and interference, and to differentiate it from other pulses. Finally, addition block 44 accepts positive external coupling through the couple input 54 to $V_i$ 42 to implement the coupling aspects of the PCO.

Figure 6:
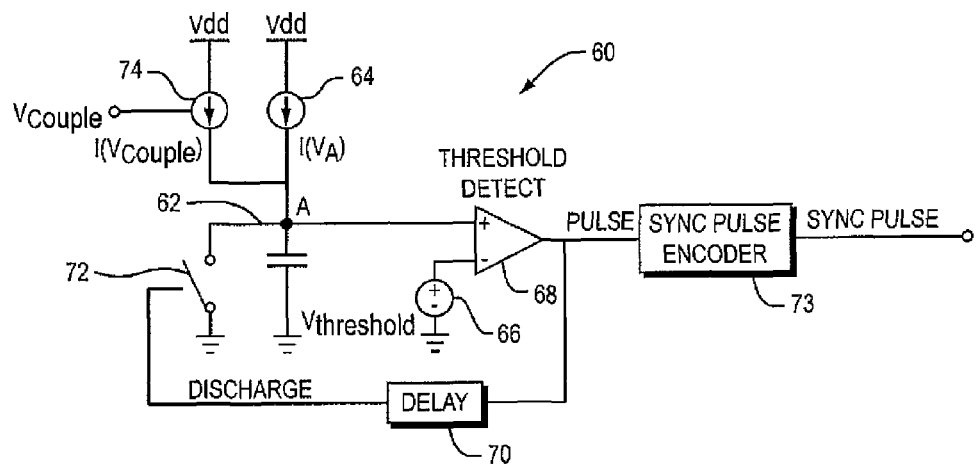
FIG. 6 is an analog circuit schematic implementing the oscillator circuit of FIG. 4.

An example of an all analog, on chip implementation of the generic oscillator 40 of FIG. 5 is the circuit 60 of FIG. 6. The PCO state function is represented by the voltage A at node 62 with respect to time. Node 62 is charged up by a current source $I(V_A)$ 64 that is monotonically decreasing with $V_A$. When $V_A$ exceeds the threshold set by $V_{threshold}$ 66 as determined by comparator 68, it goes through a delay path 70 that causes a switch 72 to discharge voltage A on node 62 rapidly to ground, thereby generating an output pulse to sync pulse encoder 73 of width controlled by the delay path. The ΔV function is provided by a synchronizing pulse turning on current source 74 for a predetermined pulse width.

Figure 7A:
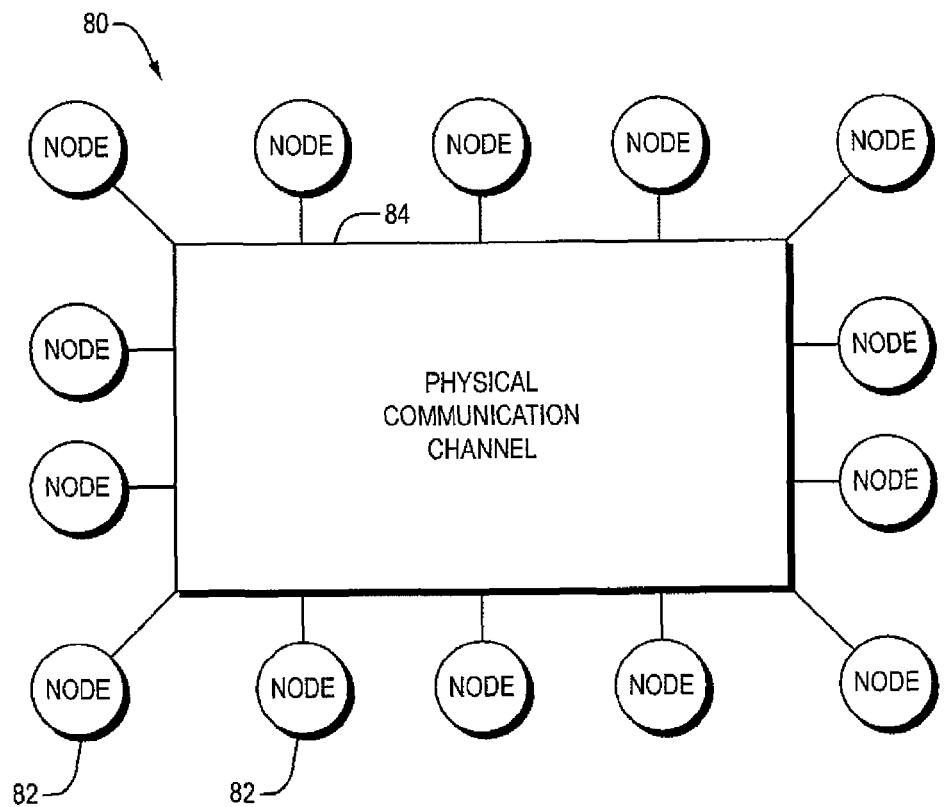
FIG. 7A is a generic network block diagram of a network constructed in accordance with one embodiment of the present invention.

A generic system level view of a system or network 80 is shown in FIG. 7A. The nodes 82 are connected to every other node through a communications channel 84, such as a wireless link. The most general form of an individual node 82 is diagrammed in FIG. 7B. Each node 82 implements a physical interface driver 86 to interface with the physical channel 84 in the transmit mode and an R.F. front end circuitry 87 in the receive mode. Front end circuitry 87 may include a low noise input stage and a high gain second stage, and include transmit switching to prevent feedback during transmission by driver 86. A sync pulse detector 88 is used to extract the synchronization pulse from the received information at R.F. front end circuitry 87.

Figure 7B:
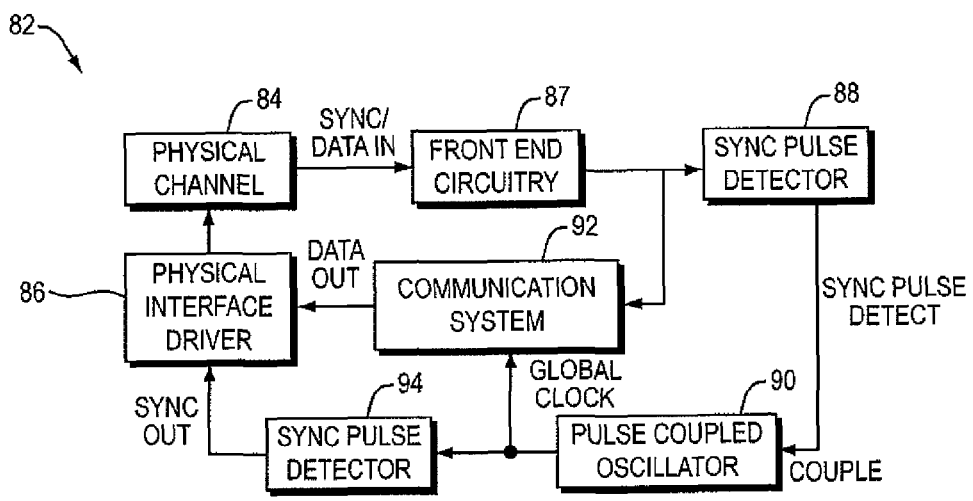
FIG. 7B is a schematic block diagram of a transceiver node for the network of FIG. 6A, constructed in accordance with one embodiment of the present invention.

Each node 82 also implements the pulse coupled oscillator 90 described above in reference to FIG. 6, whereby the global clock in the system is mutually created. This global clock may be used by a communications system 92 to facilitate communications between individual nodes 82. The communications system 92 may or may not be on the same node as that implementing the PCO functionality, as is shown in FIG. 7B. However in any either case, the global clock is generated through the PCO function and the communications system 92 uses it to time its communications. The generated clock is also transmitted out after a possible sync pulse encoder 94, to emit coupling to the other nodes 82.

Figure 8:
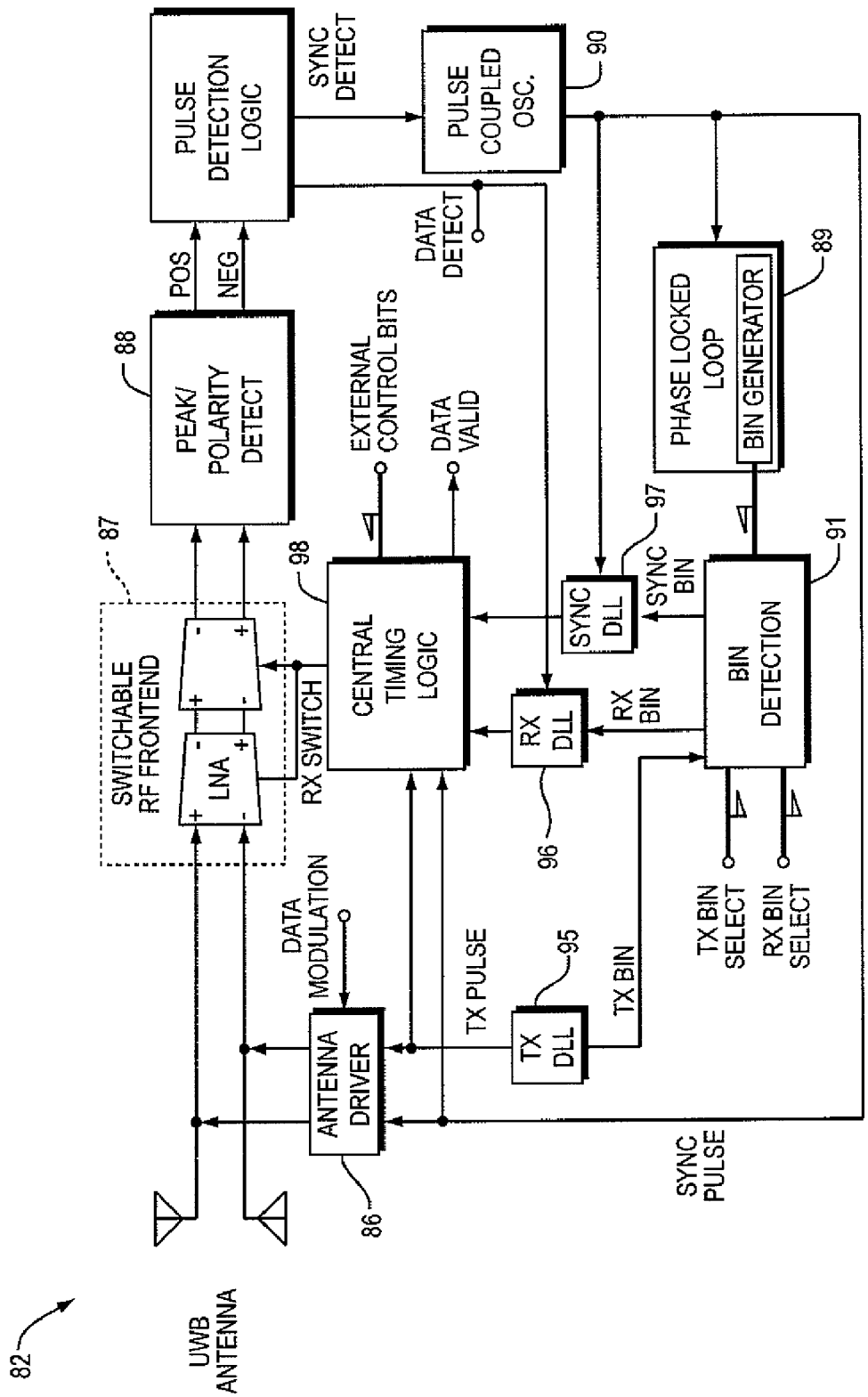
FIG. 8 is a more detailed block diagram of a transceiver node for the network of FIG. 7A, constructed in accordance with one embodiment of the present invention.

FIG. 8 shows a more specific manifestation of the individual node 82 of FIGS. 7A and 7B. In front end 87, a generic four stage differential amplifier chain is used to provide gain from the antenna. Each differential amplifier stage is implemented as a simple cascaded common source with resistive feedback. Each stage provides 11 dB of gain, with earlier stages drawing more current and using larger devices while later stages consume less current and use larger resistors. The stages are AC coupled. To demonstrate PCO synchronization, the receive amplifiers are neither designed to match 50Ω nor have optimum noise figure. The amplifiers are designed to turn off and on rapidly. For that purpose, the differential amplifier stages include an NFET switch that turns on or shuts off the current to the amplifier. Inductors are avoided so that we may generalize this design to a simple digital CMOS process. This RF front end consumes 21 mW when on.

FIG. 8 shows the additional detail of a phase locked loop 89, that takes the output of the pulse coupled oscillator 90 and divides each cycle of oscillator 90 in to a plurality of time frames and time bins as described in reference to FIG. 2. This time frame and time bin data is coupled to a Bin detection circuit 91 which receives inputs from a separate controller as to which bins to use for each of the transmit, receive and synchronize functions. This bin detection data is further used by further delay locked loops 95, 96, 97 to more finely control the transmit, receive and synchronize functions, respectively. A Central timing logic 98 takes the outputs of the delay locked loops 95-97 and the state of the system defined by a set of input control bits from an external controller (microcontroller, microprocessor, DSP, FPGA, hardware state machine implementation) to decide if the RF should be turned off. The central timing logic 98 also detects if lock was lost and gives that information to the controller. Finally the central timing logic 98 also determines if a valid pulse was detected and will provide the data to the controller to record.

The external controller is responsible for maintaining the state of the system (to determine in which step of the above process the node is functioning), to provide the bin of transmission and reception, to implement a suitable encoding scheme for the bit error rate of the system, and to record the detected data pulse. Since all pulse detection and processing functions are implemented on chip, the external controller only needs to run at the pulse rate, which is the slowest timescale in the system. Thus, even a simple, low cost microcontroller can be used as the controller.

Figure 9:
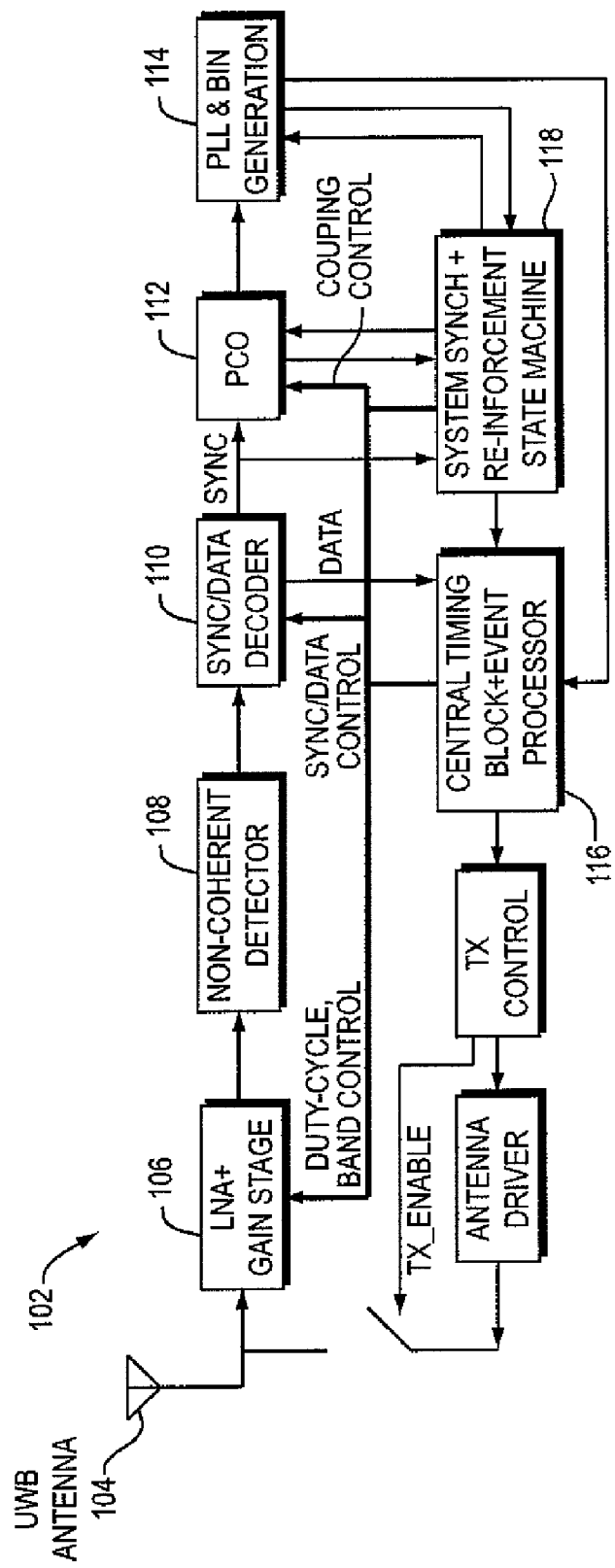
FIG. 9 is an alternate block diagram of a transceiver node for use in the network of FIG. 7A.

An alternate embodiment of the node 82 of FIG. 8 is shown in circuit 102 of FIG. 9. The transceiver chain in circuit 102 includes of a UWB antenna 104, duty-cycle-able and/or band-controllable Low Noise Amplifier (LNA) 106 and amplifying stages followed by a non-coherent detector 108. This is followed by Sync/Data Decoder 110 that qualifies the detected signal as either Sync or Data. The sync Pulse goes to a PCO 112 that in conjunction with the PLL 114 generates the bins. Every time PCO 112 fires, a sync pulse is generated, creating the timing boundaries (frame-boundary of rate Tframe) for a network. The PLL 114 divides the PCO rate (Tframe) to N number of bins (Tbin). In these bins the sync pulse is fired in the sync bin, aligned with the frame boundary. Data is sent or received in bins decided by the central timing block 116. A system Sync State machine 118 locally detects and maintains the synchronization which enables data-communication between nodes. Once the nodes are synchronized as detected by the Sync-state machine 118, the RF duty-cycling can start, thereby resulting in power saving for the system.

Saving power in independently powered nodes is significantly impacted by duty cycling of power-hungry R.F. components. This duty cycling is dependent upon synchronization between the nodes, which requires both attaining and maintaining synchronization. The variability or scalability of such networks is enhanced by dynamic and independent node determination of its own mode of operation between master and slave. The specific process of nodes joining and/or leaving a network is even further enhanced by providing clear distinction to the nodes between synchronization and data pulses.

Each node includes a state machine for controlling the mode of operation of each node between an unsynchronized, or self-synchronizing mode and either master or slave synchronized modes of operation. Synchronized operation enables duty cycle power control, or duty-cycling of R.F. components. The operation of this state machine is functionally depicted in the flowchart of FIG. 10. The determination of synchronization and duty cycling within the state machine is based upon the detection of the following events, which are described below in reference to FIGS. 10 and 11.

A PCO Firing event is registered when the pulse coupled oscillator (PCO) reaches the end of its cycle and resets, causing a sync pulse to be transmitted from the node.

A Sync event is registered whenever an external sync pulse is detected from another node outside of a small blackout window immediately following a PCO Firing event. This blackout window avoids self-coupling and race conditions that might otherwise exist.

A Sync-PCO-Overlap event is registered when a Sync event is followed by a PCO Firing event within a small predetermined timing window, indicating that the PCO Firing event likely occurred as a result of the Sync event.

A First Event is determined whenever a Sync-PCO-Overlap event is registered subject to the condition that a Sync event counter is less than or equal to one. Thus, a First Event means that a node has had a PCO Firing event caused by a single Sync event. This means that the node is functioning within a synchronized network of nodes as a slave node. If a PCO Firing event occurs without a Sync event, the node is not operating as a slave. If more than one Sync event is detected between PCO Firing events, then the node is not yet synchronized to a network. By a predetermined number of successive occurrences of the First Event, the state machine knows to select a synchronized slave mode of operation for the node. The First Event is represented in the drawings as Event1.

A Second Event is determined whenever a PCO Firing event occurs without detection of any Sync event during successive PCO Firing events. Thus, a Second Event means that a node is either operating as a master node in a network or is alone. By successive occurrences of the Second Event, the state machine knows to select a synchronized master mode of operation for the node. The Second Event is represented in the drawings as Event2.

Figure 11:
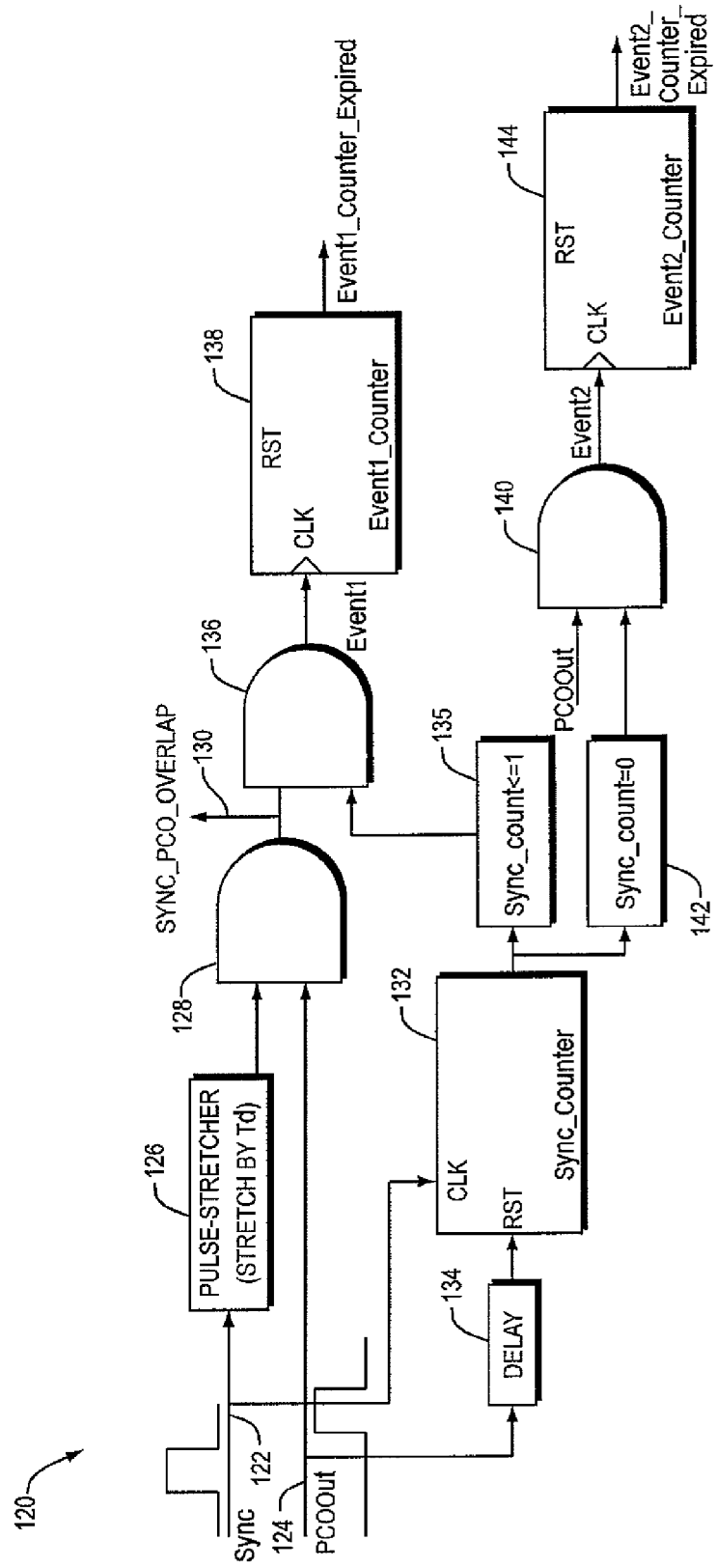
FIG. 11 is a block diagram of circuitry used for detecting certain events used by the state machine represented in FIG. 10.

FIG. 11 is a circuit diagram of detection circuitry 120 used for detecting the events described above. More specifically, received sync pulses within a node are coupled via input 122, and PCO Firing events are coupled to input 124. For determining a Sync-PCO-Overlap event, received sync pulses are first stretched in time by pulse stretcher 126, and the result is anded in gate 128 with a PCO Firing event. The coincidence of the PCO Firing event within the stretched sync pulse results in the Sync-PCO-Overlap event at output 130.

The received sync pulses on input 122 are also coupled to the clock input of a sync counter 132. The PCO Firing events are also coupled through a delay circuit 134 to the reset input of sync counter 132. Delay circuit 134 represents the blackout window mentioned above, within which received sync pulses are not detected. Although a sync signal may clock counter 132, the PCO Firing event will reset those counts at the end of the blackout window. The contents or output of sync counter 132 indicate the Sync events detected between PCO Firing events and outside of the blackout window. Output register 135 indicates when counter 132 is indicating one or fewer Sync events, and this is anded in AND gate 136 with the Sync-PCO-Overlap event at output 130. The output of AND gate 136 is the existence of a First Event. If more than one Sync event is detected within successive PCO Firing events, this indicates lack of synchronization and a First Event is not detected. AND gate 136 clocks a Event1_Counter 138 to track a predetermined number of First Events, which are detected as a basis for switching to the slave mode of operation.

Second Events are detected by coupling sync counter 132 to AND gate 140 via a register 142, which indicates when the Sync event count is zero. This is anded with PCO Firing events to detect Second Events. Detected Second Events are used to clock a Event2_Counter 144, the content of which is the basis for engaging the synchronized master mode of operation Thus, the slave and master configuration for a node is self determined and is dynamic. A Slave configuration means the node fires after detecting sync. A slave configuration means a node needs coupling from other nodes in the network during synchronized state. While a master configuration means the node is the first to fire and that it doesn't need coupling from other nodes, the PCO firing by other neighboring nodes gets buried in the blackout window and hence doesn't impact the PCO of the node.

Figure 10:
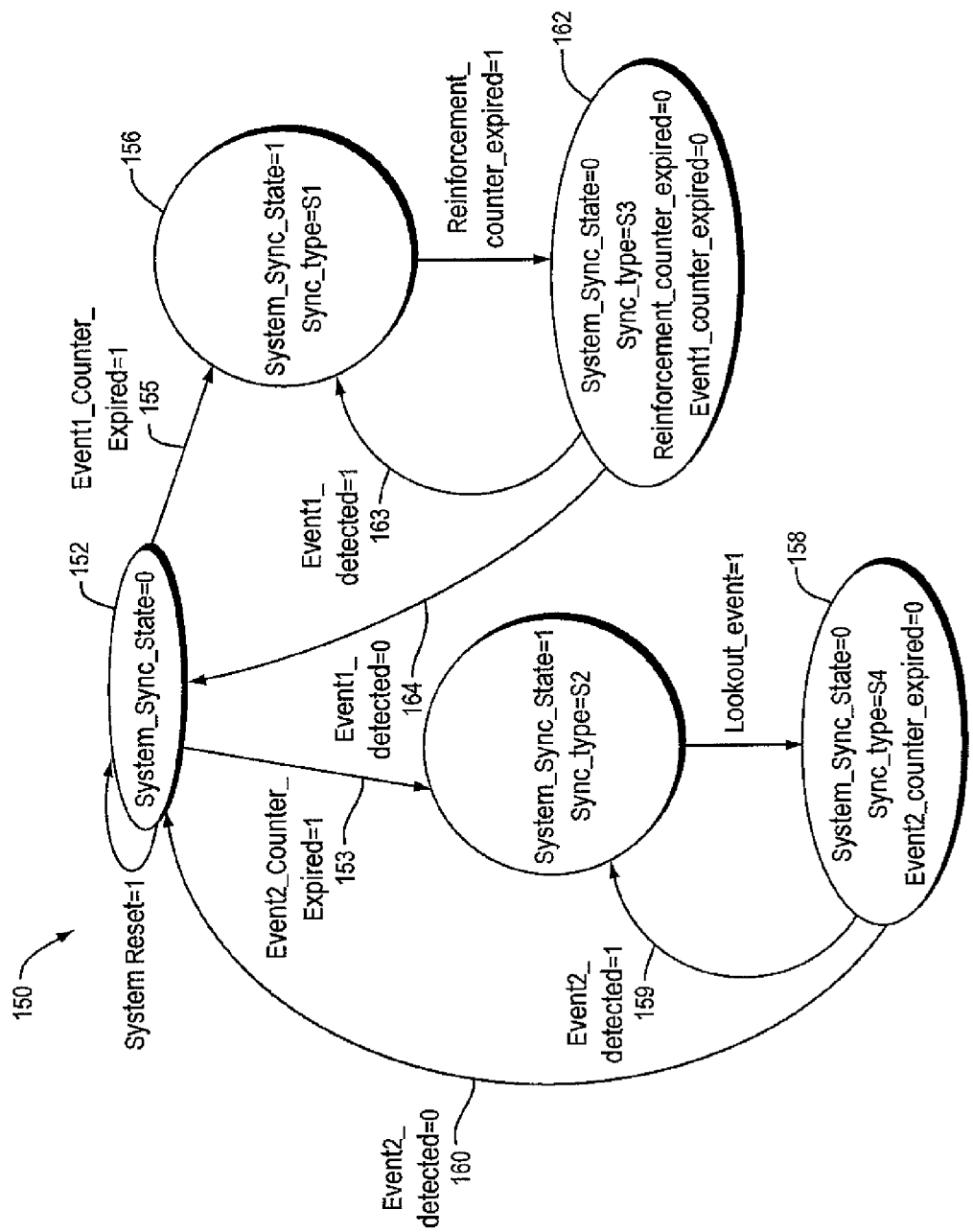
FIG. 10 is a flow chart of a state machine used for controlling the modes of operation of an independent wireless node in accordance with an embodiment of the present invention.

Again, FIG. 10 is a flowchart of a state machine 150 which is adapted to control the modes of operation of a wireless node constructed in accordance with the present invention. Nodes begin with unsynchronized operation and a system_sync_state is set to zero in state 152. In this state 152, the outputs of event one counter 138 (FIG. 11) and event2_counter 144 (FIG. 11) are monitored. When event2_counter 144 expires in state 152, state machine 150 uses step 153 and switches to synchronized state 154 as a master node, setting system_sync_state equal to one. When event1_counter 138 expires, state machine 150 takes step 155 and switches to synchronized state 156 as a slave node, also setting the system_sync_state equal to one.

In the master mode of operation of state 154, state machine 150 engages duty cycling of R.F. components so that the R.F. receive circuitry is only activated during time periods when sync pulses and data pulses are expected. In order to adjust to dynamic changes in the network based upon movement between nodes and changes in the number of nodes, the master mode of operation periodically switches on R.F. duty cycling to determine the presence of additional nodes or the lack of synchronicity between nodes. This is done by means of a lookout_counter run by state machine 150, which counts a predetermined number of PCO cycles, i.e. 100, and then switches to state 158 and enables the R.F. receive circuitry during one or more PCO cycles. In the event that no sync pulses are detected outside of the blackout window for a predetermined number of PCO cycles, state 158 uses step 159 to return to the synchronized master mode of state 154. In the event that state 158 does detect sync pulses transmitted from other nodes outside of the blackout window, step 160 is used to return to unsynchronized state 152.

In the slave mode of operation, a node is dependent upon the receipt of sync signals from other nodes to maintain effective PCO timing within in the system. On occasion, such sync signals may not be detected. To compensate for this event, each node reinforces its PCO timing by means of its phase locked loop circuitry 114 (FIG. 9). For this purpose, the slave mode of operation of state 156 monitors the occurrence of the First Event to determine that an appropriate sync signal is detected for each PCO Firing event. If a sync signal is not detected, state machine 150 switches to state 162, which disengages duty cycling and watches for the occurrence of a First Event. If a First Event is detected, step 163 returns state machine 150 to the synchronized slave mode of state 156. If a First Event is not detected for a predetermined number of PCO firings, step 164 switches the node back to unsynchronized state 152.

Figure 12:
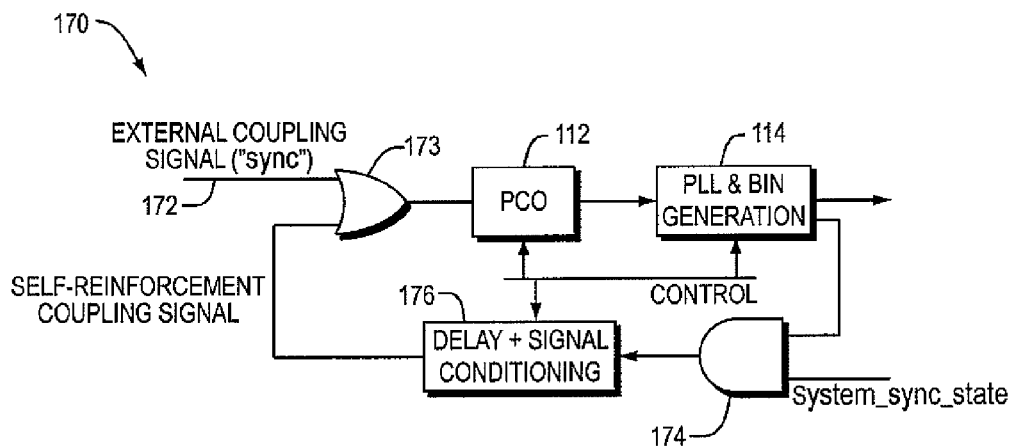
FIG. 12 is a block diagram of logic circuitry used by the state machine of FIG. 10.

FIG. 12 is a block diagram of reinforcement circuitry 170 by which the phase locked loop 114 (FIG. 9) is used to maintain node timing in the event of an undetected sync pulse. Reinforcement circuitry 170 receives detected sync pulses on input 172, which are coupled through OR gate 173 to PCO 112. An output of phase locked loop circuitry 114 is anded in gate 174 with the system_sync_state, and the output is coupled through a delay circuit 176 to another input of OR gate 173. In the absence of a detected First Event, the output of AND gate 174 is coupled through delay circuit 176 and OR gate 173 to act as a pseudo sync pulse for PCO 112. Thus, timing of the node may be more accurately maintained, at least for a predetermined number of PCO firings.

Figure 13:
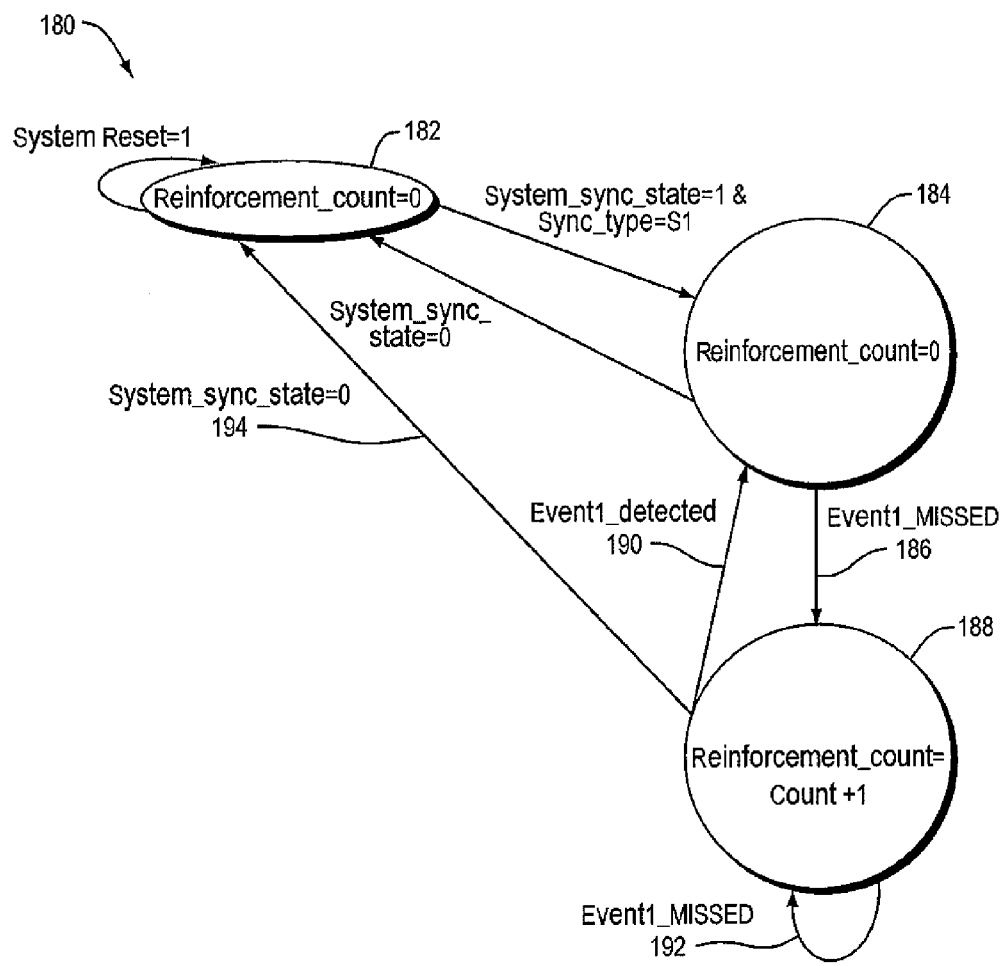
FIG. 13 is a flow chart of a timing reinforcement function used in conjunction with the state machine of FIG. 10 and the block diagram of FIG. 12.

FIG. 13 is a flow chart of a reinforcement state machine 180 used in conjunction with the circuitry of FIG. 12. Reinforcement state machine 180 keeps track of a reinforcement count and is employed only if the node goes into the synchronized state as a slave node, i.e. SYNCH_TYPE="S1". As mentioned above, if self-reinforcement is enabled, the PLL 114 (FIGS. 9 and 12) provides sync pulse reinforcement to the PCO 112 (FIGS. 9 and 12) to help retain PCO synchronization, and neighboring nodes in the network waiting on the PCO firing get a Sync event, thereby further supporting network synchronization. When state machine 150 of FIG. 10 is running in the synchronized slave mode of state 156, the initial state 182 of state machine 180 switches to the State 184 of monitoring a reinforcement_count. If a First Event is missed, step 186 moves the reinforcement tracking process to state 188 where the reinforcement_count is incremented. If a First Event is detected, step 190 returns state machine 180 to the monitoring mode of state 184. If however, a further First Event is missed, step 192 again increments the reinforcement_count. Once a predetermined number of sequential First Events are missed, as determined by the reinforcement_count, step 194 changes the system_sync_state to 0 and state machine 150 is returned to the unsynchronized state 152.

Even though the implementation of the self-reinforcement is done in a decentralized manner, the state machine will come to know that the self-reinforcement has happened as it will detect a non occurrence of a First Event. Based on the knowledge of missing the First Event, the state machine increases the reinforcement count, till the count expires based on pre-programmed value.

This reinforcement thus helps in maintaining the synchronization as well as detection of loss of synchronization. This can be implemented using standard logic gates. Reinforcement for some networks might also be disabled based on the internal PLL drift and the synchronization accuracy requirements for the system. For most networks adequate synchronization may be maintained over one to two cycles of reinforcement.

Thus, there are programmable counters in the system that keep the count for First Events (event1) and Second Events (event2) thereby helping the state-machine to transition from a non-synchronized state to synchronized-state. There is a reinforcement counter also available in the system that keeps track of the number of times the self-reinforcement has happened thereby detecting potential loss of synchronization and helps the state machine transition back to non-synchronized state. Similarly there is a lookout counter that facilitates a node in the master configuration to go out and open the window to see if any new nodes have joined the network occasionally, which are not in synchronized state or if there is a requirement for the node to switch role. Lookout steps get triggered whenever a pre-programmed lookout counter expires and is masked when data-communication is happening in the system.

As mentioned above, the specific process of nodes joining the network is enhanced by the ability to distinguish between sync and a data pulses. The nodes described herein may use a suitable method to provide this distinction. Two methods are presented including a pseudo coherent self-correlated signature detection method and a dual-banded time-interleaved sync and data communication method.

Figure 14A:
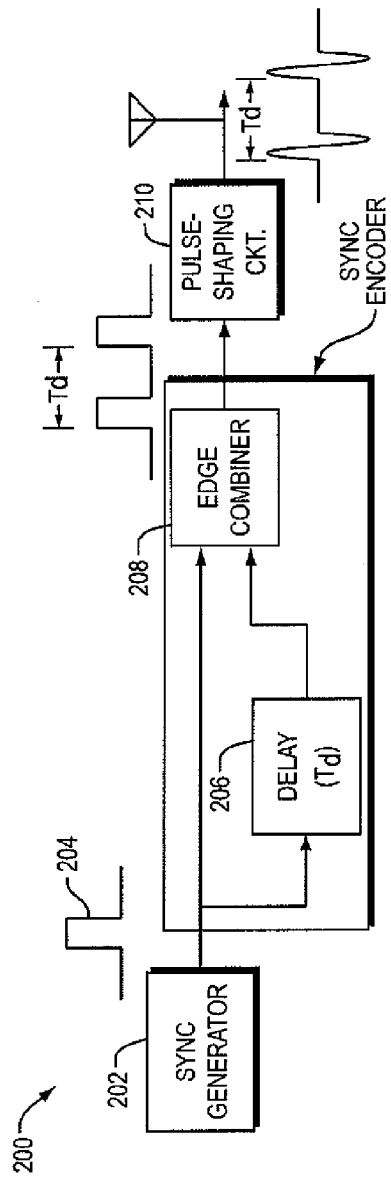
FIG. 14A is a block diagram for generating a dual sync pulse for transmission.
Figure 14B:
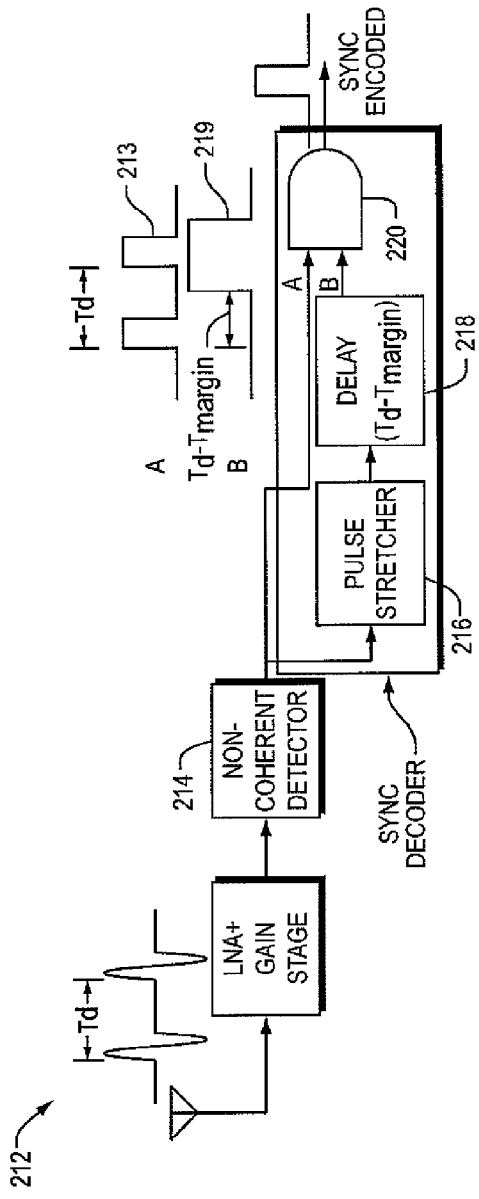
FIG. 14B is a block diagram for decoding a dual sync pulse upon reception.

As shown in FIGS. 14A and 14B, a pseudo-coherent self-correlated signature detection method encodes the synch pulse as a double pulse, while the data-pulse is encoded as a single pulse. A signal processor 200 for transmission of the double sync pulse is shown in FIG. 14A. A generator 202 produces a sync pulse 204 which is coupled to a delay circuit 206 and an edge combiner 208, such as an OR gate. Delay circuit 206 embodies a predetermined time delay $T_d$ for separating the two pulses. The delayed pulse is also coupled to an input of edge combiner 208. The dual pulse output of edge combiner 208 is connected to a pulse shaping circuit 210.

FIG. 14B shows a signal processor 212 for decoding the dual sync pulses in a self-correlated manner. The advent of first pulse creates a time window in which the circuit looks for the detection of the second pulse. If a second pulse is detected in the specified window then the received pulse is considered to be the sync. The output 213 of a non-coherent detector 214 is coupled to a pulse stretcher 216 and a delay circuit 218. The output 219 of delay circuit 218 is then anded in AND gate 220 with the output 213 from detector 214. As shown by the output 219, pulse stretcher 216 provides a larger pulse for comparison to compensate for process variations in the detection window. Delay circuit 218 provides a delay of $T_d - T_{margin}$ to provide over lap between the stretched pulse and the detected second sync pulse. The method as shown in FIGS. 14A and 14B may be readily implemented with existing CMOS logic gates.

Figure 15:
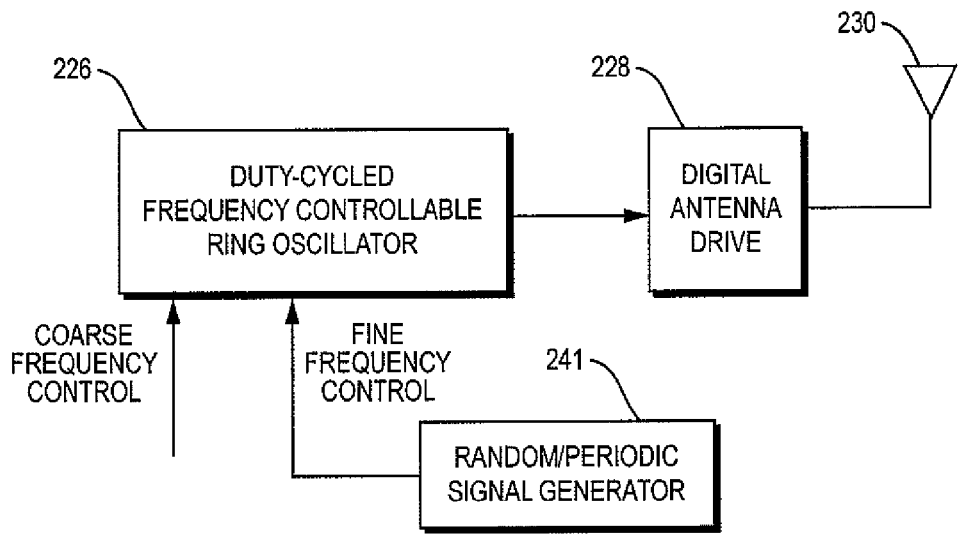
FIG. 15 is a block diagram of an R.F. circuit for switching R.F. frequencies.

The alternate method of a dual-banded, time interleaved sync/data distinction is readily adapted for use in pulse coupled oscillators. When not synchronized the nodes will be looking for sending and receiving the sync pulse, and the transmitter and receiver circuits can both be configured to the sync channel. Within synchronization, the sync and data pulses are time separated for each node. That means the same set of receiver and transmitter circuits can be used for both sync and data pulses, avoiding duplication and saving power and circuit area. FIG. 15 shows a simplified block diagram where a duty-cycled, frequency controllable oscillator 226 is coupled to a digital antenna drive 228 and antenna 230 for implementation.

Figure 16A:
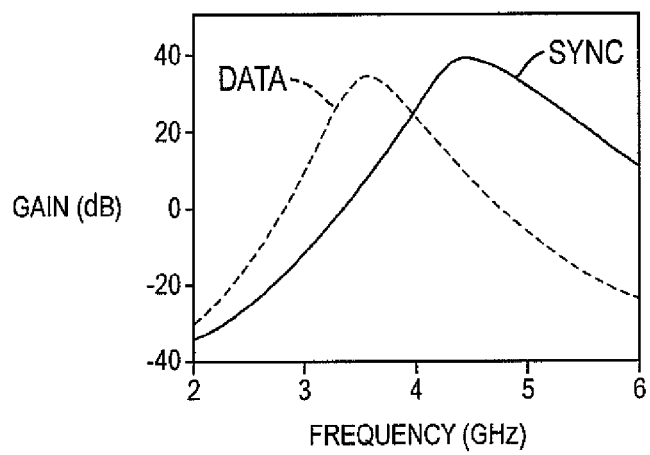
FIG. 16A is a spectral diagram for receiver gain used for dual band reception.
Figure 16B:
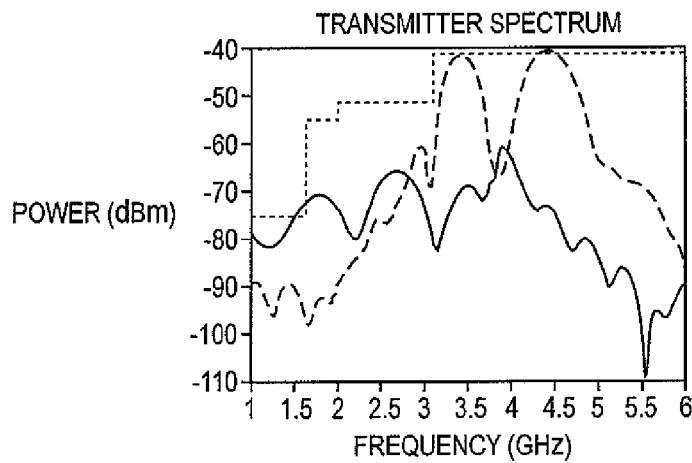
FIG. 16B is a spectral diagram of transmission power for dual transmission bands.

In the dual-banded approach, the transmitted pulses can be shaped to reside in respective bands, and similarly for the receiver, the gain can be dynamically configured to have band-selectivity. FIG. 16A shows frequency selective gain curves for a receiver, and FIG. 16B shows the shaped spectrum of transmitted pulses, each having a 500 MHz bandwidth around 3.5 GHz and 4.5 GHz for the data and sync pulses, respectively. Depending upon availability, the two frequency channels can be selected to be in any band. In essence any two bands (within UWB specification) with sufficient isolation between them can be utilized.

Figure 17:
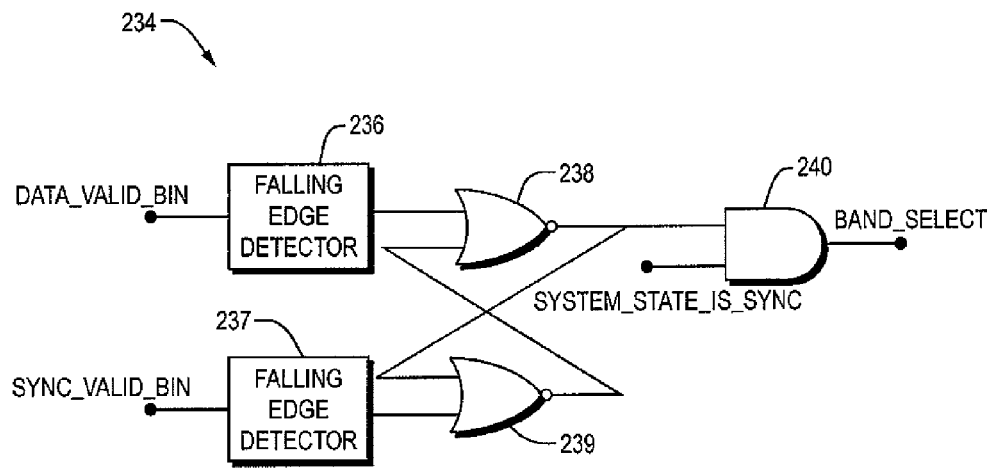
FIG. 17 is a logic circuit diagram for switching between separate frequency bands according to one embodiment of the present invention.
Figure 18:
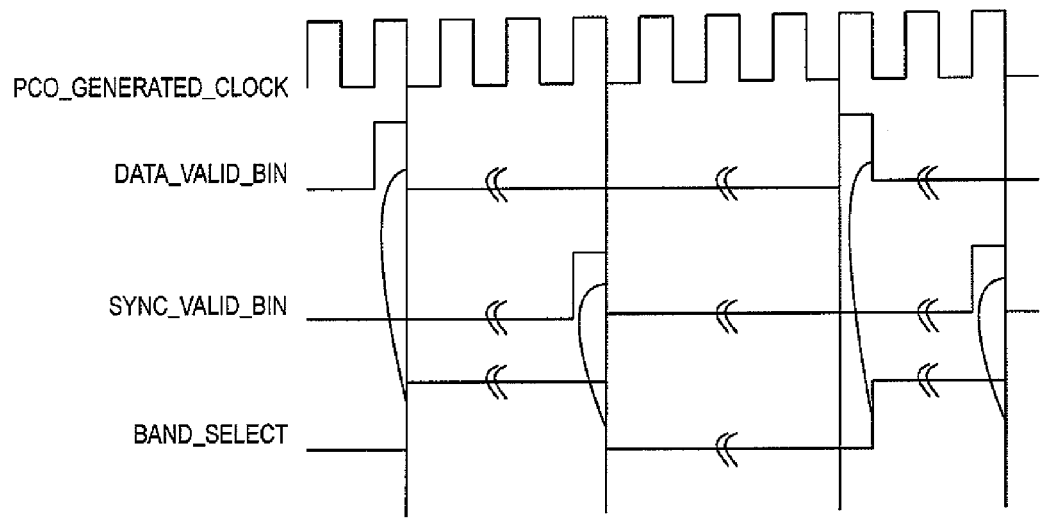
FIG. 18 is a timing chart of dual band switching in accordance with one embodiment of the present invention.

Since, the node knows the interested band at any given time, the transmitter and receiver operations can be time interleaved. The timing generation circuit 234 for the band selection is shown in FIG. 17, while the representative timing is shown in FIG. 18. A pair of falling edge detectors 236, 237 are used to latch a pair of coupled NOR gates 238, 239 to indicate that either a sync or data pulse is expected next. NAND gate 240 only applies this selection when the node is in a synchronized mode of operation. The end of data-valid bin changes the selection to sync, while the end of sync-valid bin changes the selection to data. When the system is not synchronized only sync pulses are used, and the band selection is set to sync. Once in synchronized state the logic toggles the band between sync and data alternatively decided by sync and data bins. This switching is shown in FIG. 18. Again the circuit implementation for this communication scheme may be done in a standard CMOS process.

Figure 19:
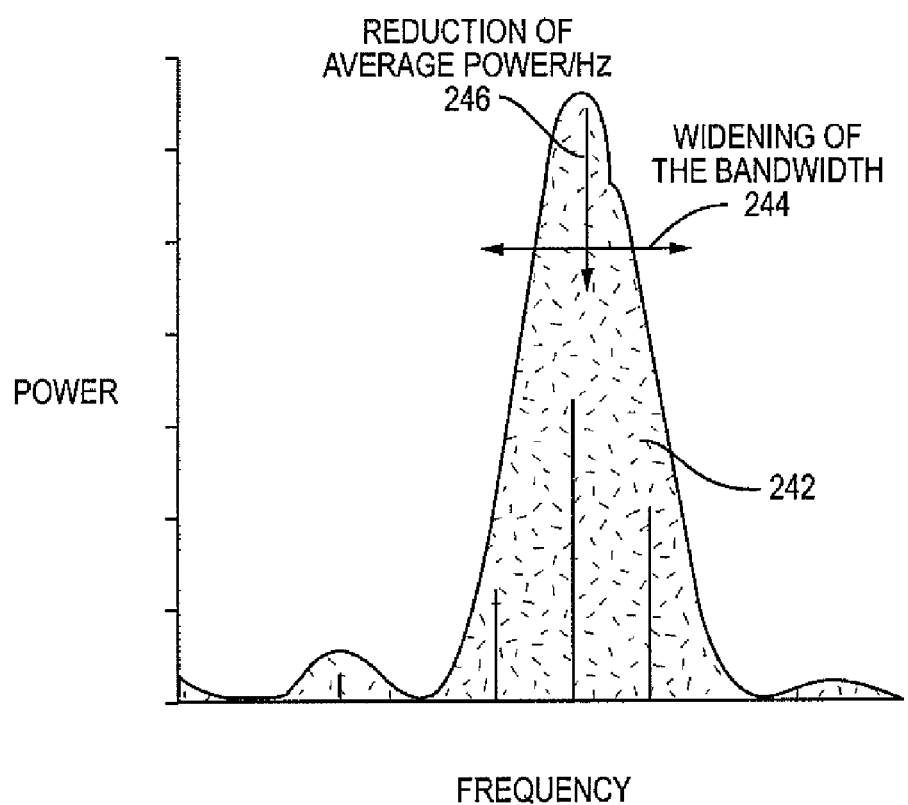
FIG. 19 is a spectral transmission diagram for a frequency dithering technique used in conjunction with the present invention.

For UWB radios, there are certain requirements for spectral shape, which requires intelligent shaping and bandwidth control for the transmitter. As is well known a wavelet emitted by a transmitter has it's power distributed around the frequency of the carrier. In the present case, spectral shaping is achieved by randomly or periodically changing the carrier frequency by a very small amount. This dithering or varying of the center frequency in time on average creates a more averaged output power spectrum and is useful for shaping the spectrum, per the average power at a particular frequency according to FCC regulations. This varying or dithering can be done at a very slow rate and can be done in a random manner or a periodic manner. It can also be controlled, such that one changes the fine-control for the frequency (FIG. 15) only when a pulse is transmitted as shown by the random/periodic signal generator 241 of FIG. 15. This dithering can be done for this type of system due to the use of the non-coherent signal detection at the receiver. FIG. 19 shows the effect of this dithering on an nominal transmission spectrum 242, by widening 244 and shortening 246 the transmission spectrum.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. An independent node for operating in a wireless communications network including a plurality of said independent nodes, comprising:

R.F. circuitry adapted for wirelessly transmitting and receiving pulses between nodes;

an internal pulse coupled oscillator (PCO) having a periodic state function ending in a PCO firing, and coupled to the R.F. circuitry for transmitting a sync pulse at the PCO firing;

circuitry coupled to increment the state function in response to external sync pulses received from other nodes; and a state machine adapted to switch between synchronized and unsynchronized operation in response to sync pulses received from other nodes, and including first circuitry coupled to identify if and when external sync pulses from other nodes are received between PCO firings to cause the state machine to select either an unsynchronized mode of operation or synchronized, slave or master modes of operation in response thereto.

2. The node of claim 1, wherein the first circuitry is coupled to identify a First Event if a single external sync pulse is received from other nodes between PCO firings and within a predetermined period before the PCO firing.

3. The node of claim 2, wherein the first circuitry includes a counter coupled to determine if a predetermined number of First Events occur to cause the state machine to select a synchronized, slave mode of operation in response thereto.

4. The node of claim 3, further comprising a phase-locked-loop (PLL) coupled to the PCO to generate time interval signals between PCO firings, wherein the first circuitry is adapted to indicated when an external sync pulse from another node is not received in the slave mode of operation, and further wherein the PLL is coupled to provide an internal sync pulse to the PCO in the selected slave mode of operation when an external sync pulse from another node is not received between PCO firings.

5. The node of claim 1, wherein the first circuitry is coupled to identify a Second Event if no external sync pulses are received from other nodes between PCO firings except for a predetermined window following the PCO firing.

6. The node of claim 5, wherein the first circuitry includes a counter coupled to determine if a predetermined number of Second Events occur to cause the state machine to select the synchronized, master mode of operation in response thereto.

7. The node of claim 1, further comprising circuitry coupled to the R.F. circuitry to switch between different frequency bands for the receipt and transmission of sync pulses versus data pulses.

8. The node of claim 1, further comprising pulse shaping or transmitting circuitry coupled to the R.F. circuitry and adapted to dither a center frequency of pulses transmitted from the node during transmission of the pulses to help shape a transmission spectrum of the pulses.

9. A wireless communications system having a plurality of independent nodes forming a network, each node comprising:

R.F. circuitry adapted for wirelessly transmitting and receiving pulses between nodes;

an internal pulse coupled oscillator (PCO) having a periodic state function ending in a PCO firing, and coupled to the R.F. circuitry for transmitting a sync pulse at the PCO firing;

circuitry coupled to increment the state function in response to external sync pulses received from other nodes; and a state machine adapted to switch between synchronized and unsynchronized operation in response to sync pulses received, from other nodes, and including first circuitry coupled to identify if and when external sync pulses from other nodes are received between PCO firings to cause the state machine to select either an unsynchronized mode of operation or synchronized, slave or master modes of operation in response thereto.

10. The system of claim 9, wherein the first circuitry is coupled to identify a First Event if a single external sync pulse is received from other nodes between PCO firings and within a predetermined period before the PCO firing, and further wherein the first circuitry includes a counter coupled to determine if a predetermined number of First Events occur to cause the state machine to select a synchronized, slave mode of operation in response thereto.

11. The system of claim 10, further comprising a phase-locked-loop (PLL) coupled to the PCO to generate time interval signals between PCO firings, wherein the first circuitry is adapted to indicated when an external sync pulse from another node is not received in the slave mode of operation, and further wherein the PLL is coupled to provide an internal sync pulse to the PCO in the selected slave mode of operation when an external sync pulse from another node is not received between PCO firings.

* * * * *